May 25, 1937.  C. D. STEWART ET AL  2,081,465
TRIP COCK INTERLOCK DEVICE
Filed March 5, 1936  3 Sheets-Sheet 1
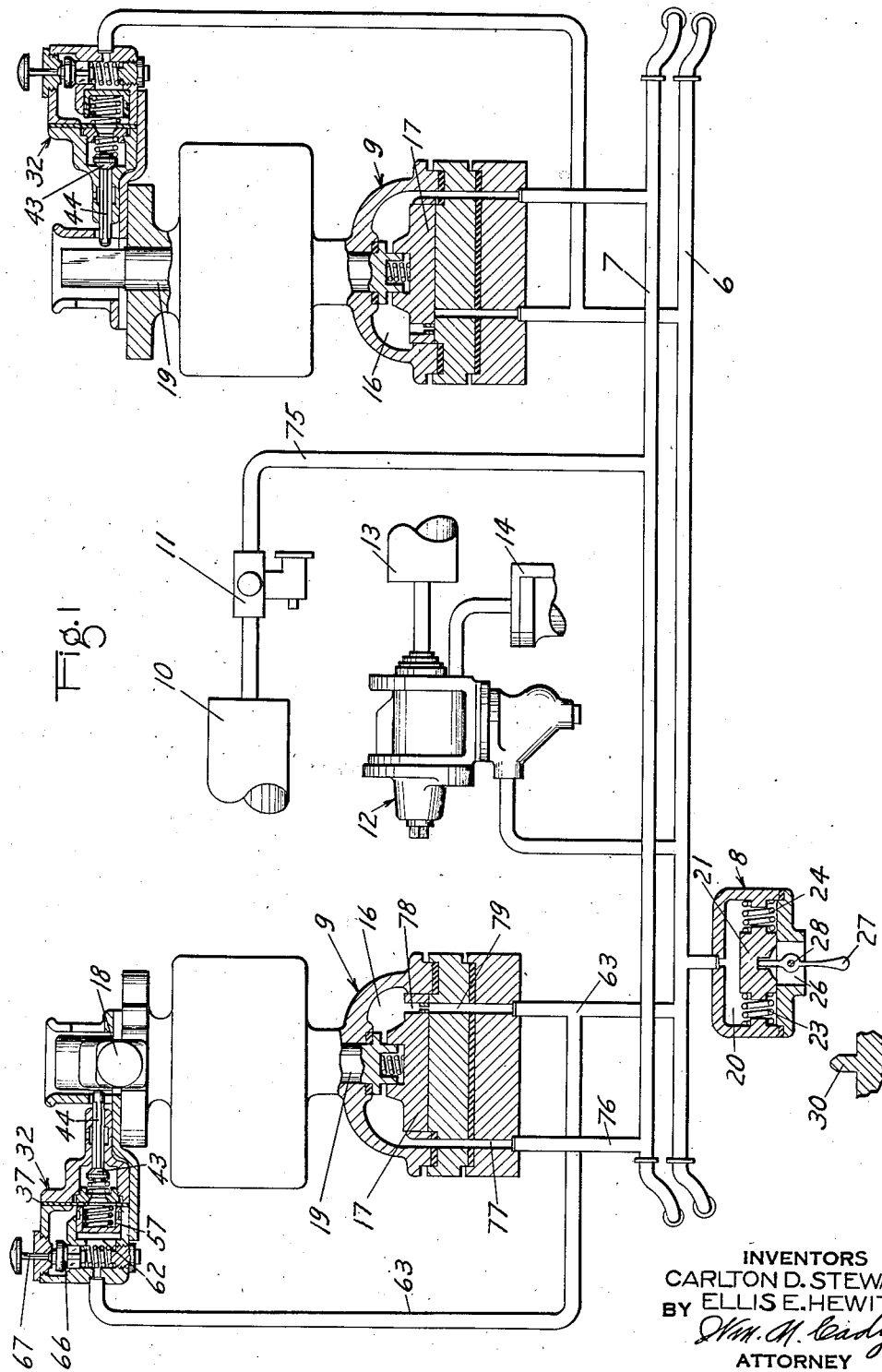
INVENTORS
CARLTON D. STEWART
BY ELLIS E. HEWITT
Wm. M. Cady
ATTORNEY

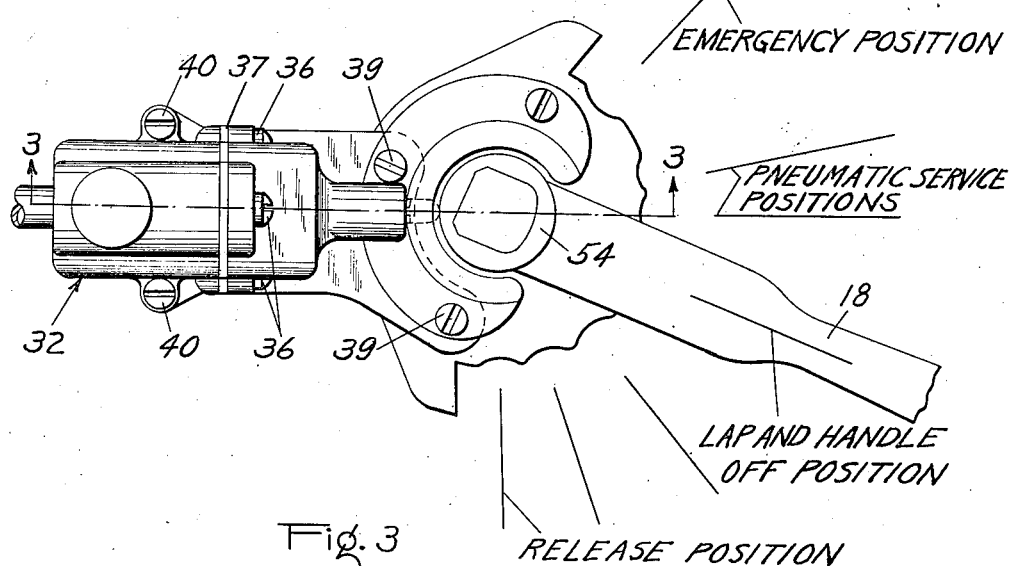
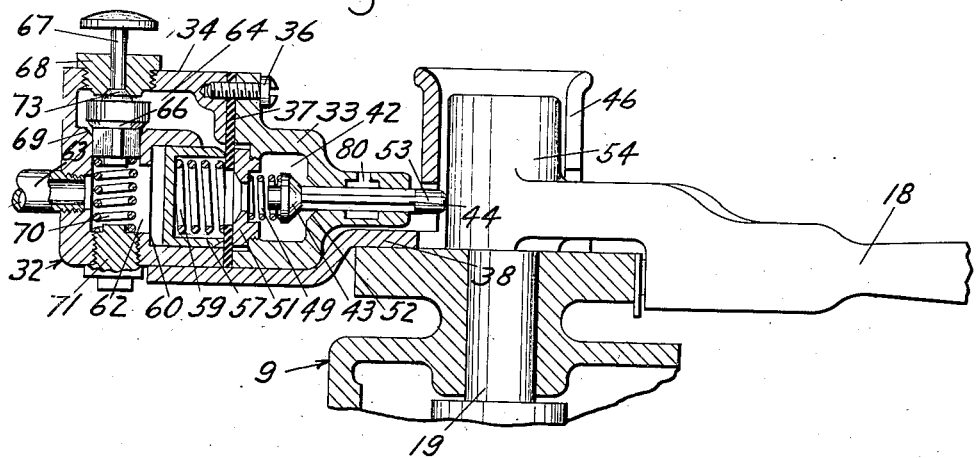

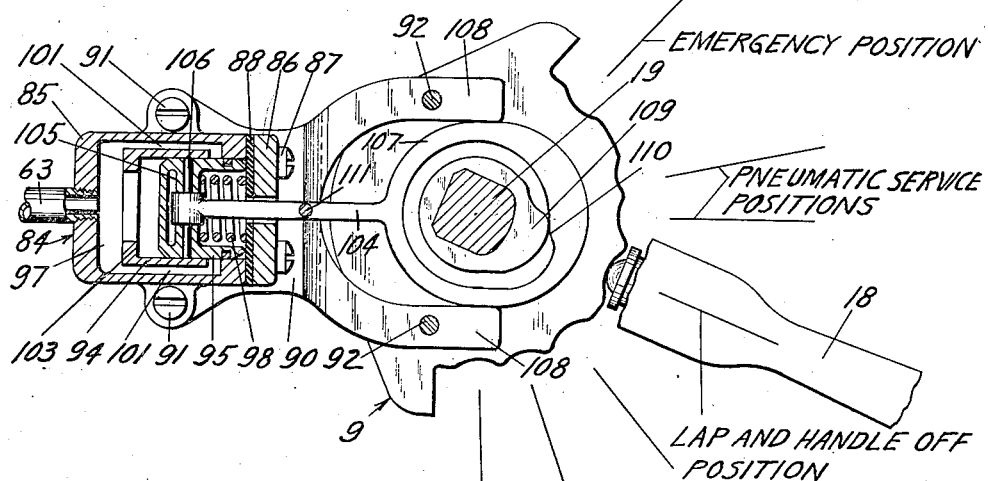
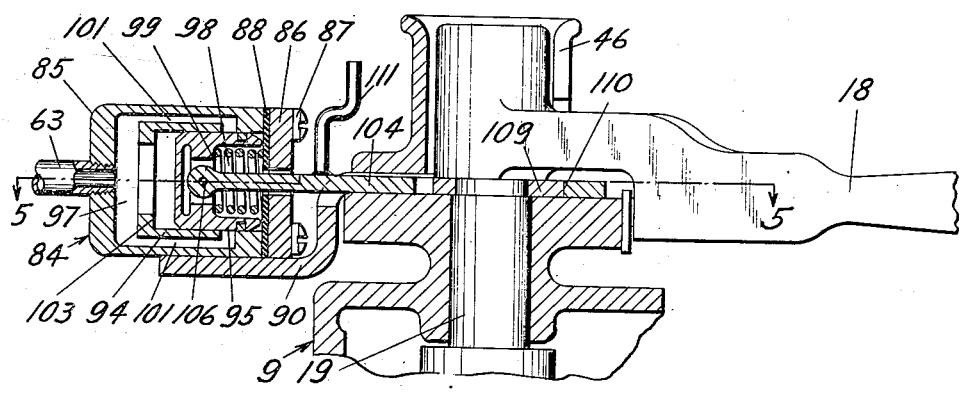

Patented May 25, 1937

2,081,465

UNITED STATES PATENT OFFICE 2,081,465

TRIP COCK INTERLOCK DEVICE

Carlton D. Stewart, Swissvale, and Ellis E. Hewitt, Edgewood, Pa., assignors to The Westinghouse Air Brake Company, Wilmerding, Pa., a corporation of Pennsylvania Application March 5, 1936, Serial No. 67,262

15 Claims. (Cl. 303—18)

This invention relates to fluid pressure brakes for railway trains, and more particularly to a brake system having associated therewith an automatic train control means for effecting an application of the brakes.

In fluid pressure braking equipment for railway vehicles employing means controlled from the track or otherwise and automatically operative to vent fluid under pressure from the brake pipe for effecting an application of the brakes, such as a trip cock device carried on the vehicle, it is desirable that means be provided for preventing release of the brakes until the operator performs a required act, which he may accomplish without leaving his post of duty.

The principal object of our invention is to provide means which is operative, upon a predetermined reduction in brake pipe pressure as effected by an automatically controlled means such as a trip cock device, to prevent restoration of brake pipe pressure for releasing the brakes, until manipulated by the operator.

Another object of the invention is to provide means of the type described above, which will be rendered inoperative by removal of the brake valve handle.

Another object of our invention is to provide means operative to apprise the motorman of the operation of the trip cock device.

In the accompanying drawings, Fig. 1 is a diagrammatic view, partly in section, of fluid pressure brake apparatus embodying one form of our invention; Fig. 2 is an enlarged detail plan view of a portion of a brake valve device embodying the invention in the form shown in Fig. 1; Fig. 3 is a vertical sectional view taken on the line 3—3 of Fig. 2; Fig. 4 is an enlarged detail vertical view, mainly in section, of a portion of the brake valve device embodying another form of the invention; and Fig. 5 is a sectional plan view taken on the line 5—5 of Fig. 4.

Referring to Fig. 1 of the drawings, the fluid pressure brake apparatus illustrated is of the double end type, and comprises a brake pipe 6, a supply pipe 7, a trip cock 8, a brake valve device 9 at each end of the vehicle, a main reservoir 10, a feed valve device 11, and a triple valve or controlling valve device 12 having associated therewith an auxiliary reservoir 13 and a brake cylinder 14. The controlling valve device is shown in outline form, and may be of any suitable type such as a triple valve device operative upon a reduction in brake pipe pressure to supply fluid under pressure from the auxiliary reservoir 13 to the brake cylinder 14, and upon an increase in brake pipe pressure to release fluid under pressure from said brake cylinder.

The brake valve device 9 may be of any one of a number of types employed in automatic brake apparatus, and as shown diagrammatically in Fig. 1 comprises a casing having a valve chamber 16 containing a rotary slide valve 17, and may be provided with a removable handle 18 adapted to operate said rotary slide valve through the medium of a shaft 19.

The trip cock device 8 is preferably of the self resetting type and may comprise a casing having a chamber 20, which is connected with the brake pipe 6 and contains a slide valve 21. The slide valve 21 is interposed between a pair of opposing springs 23 and 24, and is adapted to control communication from the chamber 20 to the atmosphere by way of an opening 26 in the casing, the springs 23 and 24 serving to position said slide valve so as normally to close said opening. For operating the slide valve there is provided a trip lever 27, which is pivotally mounted within the opening 26 by means of a pin 28 secured to the casing, and which operatively engages the slide valve. The trip lever 27 is arranged to be operated by engagement with a stationary track member such as that indicated at 30.

According to our invention, a pair of trip cock interlock valve devices 32 are provided, one of said devices being mounted on each of the brake valve devices 9. In the form of our invention shown in Figs. 2 and 3 of the drawings, a casing is provided, comprising sections 33 and 34, which are secured together by screws 36 or other suitable means, a gasket 37 being interposed between said sections for insuring a tight joint. A bracket 38 is provided for rigidly mounting the interlock valve device to the brake valve device 9, said bracket being clamped to the brake valve by any suitable means such as screws 39, and secured to the casing of said interlock device by means of the screws 40.

A valve chamber 42 is formed in the casing section 33 and contains a valve 43, which has a fluted stem 44 extending through a suitable bore in said casing and through an opening in the handle guard 46 of the brake valve device. A spring 49 is interposed between the valve 43 and an annular member 51, which is screwed into a threaded interior shoulder of the casing section, said spring being adapted to urge the valve toward a seat 52 for controlling communication between the chamber 42 and the atmosphere. The stem 44 is of such a length that, with the removable handle 18 operatively connected to the shaft 19 and set in release or running position, the rounded end 53 of said stem operatively engages a hub portion 54 of said handle and maintains the valve 43 unseated. It will be apparent that, when the handle 18 is removed from the brake valve device, the spring will be permitted to close the valve 43, thereby cutting off communication between the chamber 42 and the atmosphere.

A hollow valve piston 57 is slidably mounted in a suitable bore formed in the casing section 34, said valve piston being arranged to be moved by fluid pressure into sealing engagement with the portion of the gasket 37 abutting the perforate annular member 51 and surrounding the central opening therein. A coil spring 59 is interposed between the annular member 51 and the inner wall of the valve piston for urging said piston away from the gasket and into engagement with a shoulder 60 of the casing. Formed at the fluid pressure side of the valve piston is a chamber 62, which is connected to a pipe 63 leading to the brake pipe 6, and communicates with a passage or valve chamber 64 formed in the casing and extending around the seating portion of the valve piston 57. A valve 66 is provided in the valve chamber 64 for controlling communication between said chamber and the chamber 62, said valve having a manually operable plunger 67 extending upwardly through a bore in the cap nut 68, which has screw threaded connection with the casing section 34. The valve 66 is adapted to engage a seat 69 when the plunger is pressed downwardly against the pressure of a spring 70, which is disposed in chamber 62 between a guide portion of said valve and a plug member 71 provided for closing the lower end of the chamber, said spring acting to urge the valve away from said seat. The plunger 67 carries a collar 73 which is normally held in sealing engagement with a seat formed at the lower end of the bore in the cap nut 68 for insuring against leakage of fluid under pressure past said plunger while the valve 66 is unseated.

As viewed in Fig. 1 of the drawings, the brake equipment is conditioned for control of the brake valve device 9 at the left-hand, which represents the brake valve device on the front end of the vehicle and is provided with the removable handle 18. The brake valve device on the front end of the vehicle is shown in release position, the other brake valve device on the rear end of the vehicle having been set in "handle off" position and the handle removed.

In operation, fluid under pressure flows from the main reservoir 10 to the feed valve device 11, which functions in the usual manner to supply fluid at the pressure carried in the brake system through the pipe 75 to the supply pipe 7, from which fluid under pressure flows by way of a branch pipe 76 and a passage 77 in the brake valve device 9 on the front end of the vehicle to the valve chamber 16. With said brake valve device in release position, fluid under pressure flows from the chamber 16 through a port 78 in the rotary valve 17 and a passage 79 to the pipe 63 and the connected brake pipe 6.

Fluid under pressure also flows through the pipe 63 to the chamber 62 in the interlock valve device 32 at the head end of the vehicle, and in order to permit the initial charging of the brake pipe, the operator presses the plunger 67 of said device downwardly, moving the valve 66 to the seat 69 against the pressure of the spring 70, until sufficient fluid pressure has been built up in said chamber to overcome the spring 59 and force the valve piston 57 into sealing engagement with the gasket 37. The operator may then release the plunger, the fluid pressure in chamber 62 acting to maintain the valve piston 57 seated, thereby preventing escape of fluid under pressure from the brake pipe. It will be understood that since the handle has been removed from the brake valve device at the rear end of the vehicle, the interlock valve device on that brake valve device is automatically conditioned to prevent escape of fluid under pressure from the brake pipe. The control valve device 12 is then operative in the usual manner to charge the auxiliary reservoir 13 with fluid under pressure from the brake pipe, and to connect the brake cylinder 14 to the atmosphere.

If the trip lever 27 of the trip valve device 8 on the vehicle is now brought into operative engagement with the stationary trip member 30, said trip lever is turned about the pivot pin 28, shifting the slide valve 21 so as to establish communication between the chamber 20 and the opening 26. Fluid under pressure is then vented at an emergency rate from the brake pipe 6 by way of the connected valve chamber 20 and through the opening 26 to the atmosphere. Upon the sudden reduction in brake pipe pressure thus effected, the controlling valve device 12 is actuated in the usual well known manner to cut off the atmospheric communication from the brake cylinder 14 and to supply fluid under pressure thereto from the auxiliary reservoir 13, thereby effecting an emergency application of the brakes.

At the same time, as the fluid pressure acting on the valve piston 57 in the trip cock interlock valve device 32 is reduced, the spring 59 is enabled to move said valve piston away from the gasket 37, thereby establishing communication from the pipe 63 through the chamber 62, past the open valve 66, through chamber 64, past the unseated valve piston, through chamber 42, and past the open valve 43 and its stem 44 to the atmosphere by way of the port 80. The sound produced by the fluid under pressure thus vented through the port 80 will immediately apprise the operator that the trip cock device has been actuated, so that he may quickly take any steps desired toward controlling the vehicle, as by shutting off the power.

After the trip cock device 8 has been operated as hereinbefore described to effect a reduction in brake pipe pressure, the slide valve 21 in said device will be shifted by action of the spring 23 so as to close the atmospheric communication, it being understood that since the brake valve handle 18 remains in release position, fluid under pressure is supplied to the brake pipe from the main reservoir in the manner already described. With the valve piston 57 of the interlock valve device 32 unseated, however, restoration of the pressure of fluid in the brake pipe 2 to the degree necessary to effect the release of the brakes is prevented, until the operator presses down the plunger 67 to effect the operation of said interlock valve device in the manner hereinbefore described in connection with the initial charging of the system.

Referring to Figs. 4 and 5, a modification of our invention is illustrated diagrammatically, in which the trip cock interlock valve device 84 is provided, comprising a casing 85 and a cover plate 86 secured thereto by means of screws 87, a gasket 88 being interposed between the casing and cover plate. The casing 85 is carried on a bracket member 90, to which it is secured by means of the screws 91, and the bracket member is rigidly mounted on the brake valve device 9 by any suitable means, such as the bolts 92.

Formed within the casing 85 is a bushing portion 94 having a bore in which is slidably mounted a valve piston 95, said valve piston forming at one side a chamber 97, which is connected to the pipe 63 and consequently with the brake pipe. The valve piston 95 is adapted to be moved into sealing engagement with the gasket 88, said valve piston being normally urged away from said gasket by the pressure of a spring 98, which acts against an interior shoulder 99 of said valve piston. A plurality of passages 101 are formed between said casing 85 and the bushing portion 94 for providing communication from the chamber 97 around said bushing portion to an opening therein, which opening is adapted to be closed by the valve piston 95 when in sealing engagement with the gasket 88 and opened when said valve piston is moved toward the stop shoulder 103 provided on the end of the bushing portion.

For controlling the operation of the valve piston 95, a cam linkage mechanism is provided, comprising a link member 104, one end of which passes through a central opening in the end plate 86 and gasket 88 and is pivotally connected to the interior bosses 105 of the valve piston 95 by means of a transversely disposed pin 106. The other end of the link member 104 is piloted through a suitable opening in the handle guard 46 and is provided with a substantially ring-shaped portion 107, which is adapted to surround the shaft 19 of the brake valve device 9 below the hub portion of the removable handle 18, said ring-shaped portion being slidably guided between the arms 108 of the bracket member 92. Secured to the shaft 19 within the ring-shaped portion 107 is a cam 109, which is arranged to engage an inwardly projecting surface 110 of said ring-shaped portion when the handle 18 is placed in "handle off" position, or in service or emergency position as shown in the drawings, the link member 104 being thereby positioned so as to maintain the valve piston 95 in engagement with the gasket 88. An operating member 111 is secured to the link member 104 by any suitable means, such as by welding, for permitting manual operation of said link member and the connected valve piston.

The operation of the interlock valve device 84 is similar to that of the interlock valve device 32 hereinbefore described. With the handle 18 of the brake valve device 9 at the front end of the vehicle placed in release position, fluid at the pressure maintained in the brake pipe in the usual manner is supplied through the pipe 63 to the chamber 97. Since the cam 109 is not in engagement with the surface 110 of the ring-shaped portion 107 in this position of the brake valve device, the operator moves the operating member 111 and link member 104 to the right, and thereby holds the valve piston 95 in sealing engagement with the gasket 88 until the fluid pressure in chamber 97 has built up sufficiently to overcome the pressure of the spring 98 and to maintain said valve piston closed. The brake valve device at the rear end of the vehicle is, of course, put in the "handle off" position, the interlock valve device 84 thereon being held in the closed position by engagement of the cam 109 with the ring-shaped portion 107 as shown in Figs. 4 and 5 of the drawings.

If the trip cock device is operated to vent fluid under pressure from the brake pipe in the manner hereinbefore described, the consequent reduction in the pressure of fluid in the chamber 97 of the interlock valve device 84 to the predetermined degree will permit the spring 98 to shift the valve piston 95 away from the gasket 88 so as to establish communication between passages 101 and a central opening in the end plate 86, permitting fluid under pressure to flow from the brake pipe by way of the pipe 63, the chamber 97, through the passages 101, past the unseated valve piston and through said opening to the atmosphere.

It will thus be seen that our invention provides trip cock interlock means arranged to permit the usual service control of the brakes through the medium of the engineer's brake valve device, and which is rendered operative upon a predetermined reduction in brake pipe pressure effected by automatic means, to prevent restoration of the normal brake pipe pressure for releasing the brakes, until the operator performs a required act.

While two illustrative embodiments of our invention have been described in detail, it is not our intention to limit its scope to those embodiments or otherwise than by the terms of the appended claims.

Having now described our invention, what we claim as new and desire to secure by Letters Patent, is:

1. In a railway vehicle brake system, the combination with a brake pipe, a reduction in pressure in which is adapted to effect an application of the brakes, and means controlled from the track for venting fluid under pressure from said brake pipe, of valve means operative to an open position upon a predetermined reduction in brake pipe pressure for venting fluid under pressure from the brake pipe, and means adapted to be manually operated for effecting the return of said valve means to the normal closed position.

2. In a railway vehicle brake system, the combination with a brake pipe, a reduction in pressure in which is adapted to effect an application of the brakes, and means controlled from the track for venting fluid under pressure from said brake pipe, of valve means normally maintained in closed position by the pressure of fluid in the brake pipe and operative to open position upon a predetermined reduction in brake pipe pressure for venting fluid under pressure from said brake pipe, and means adapted to be manually operated for effecting the return of said valve means to normal position.

3. In a fluid pressure brake, in combination, a brake pipe, means for supplying fluid under pressure to said brake pipe, brake controlling mechanism operative upon a reduction in the pressure of fluid in said brake pipe to effect an application of the brakes and upon an increase in brake pipe pressure to effect the release of the brakes, means automatically operative to vent fluid under pressure from said brake pipe, interlock means constantly subject to brake pipe pressure and operative to a position upon a predetermined reduction in brake pipe pressure to prevent a subsequent increase in said brake pipe pressure and thereby the release of the brakes, and yielding means for operating said interlock means to another position in response to manual control for permitting an increase in brake pipe pressure.

4. In a fluid pressure brake, in combination, a brake pipe, means for supplying fluid under pressure to said brake pipe, brake controlling mechanism operative upon a reduction in the pressure of fluid in said brake pipe to effect an application of the brakes and upon an increase in brake pipe pressure to effect the release of the brakes, means automatically operative to vent fluid under pressure from said brake pipe, valve means always subject to brake pipe pressure and operative upon a predetermined reduction in brake pipe pressure for establishing communication from the brake pipe to atmosphere, and yielding means operative manually for effecting the operation of said valve means for closing said communication.

5. In a fluid pressure brake, in combination, a brake pipe, means for supplying fluid under pressure to said brake pipe, brake controlling mechanism operative upon a reduction in the pressure of fluid in said brake pipe to effect an application of the brakes and upon an increase in brake pipe pressure to effect the release of the brakes, means automatically operative to vent fluid under pressure from said brake pipe, a spring, and valve means constantly subject to the opposing pressures of fluid in the brake pipe and said spring and operative upon a predetermined reduction in brake pipe pressure to establish communication between the brake pipe and the atmosphere, and manually operable yielding means for effecting the actuation of said valve means to cut off said communication.

6. In a vehicle brake apparatus, the combination with a brake pipe, means for supplying fluid under pressure to said brake pipe, and brake controlling mechanism operative upon a reduction in the pressure in said brake pipe to effect an application of the brakes and upon an increase in brake pipe pressure to effect the release of the brakes, of automatically controlled means operative to open communication from the brake pipe to the atmosphere and then to cut off said communication, valve means constantly subject to brake pipe pressure and operative to a position, in response to operation of said automatically controlled means, to prevent restoration of brake pipe pressure, and yieldingly biased means manually operative to effect movement of said valve means to a normal position for permitting build up in brake pipe pressure.

7. In a vehicle brake apparatus, the combination with a brake pipe, means for supplying fluid under pressure to said brake pipe, and brake controlling mechanism operative upon a reduction in the pressure in said brake pipe to effect an application of the brakes and upon an increase in brake pipe pressure to effect the release of the brakes, of automatically controlled means operative to open communication from the brake pipe to the atmosphere and then to cut off said communication, yielding means, and valve means operative by said yielding means in response to operation of said automatically controlled means to establish and maintain communication from the brake pipe to atmosphere to prevent restoration of brake pipe pressure for releasing the brakes, said valve means being manually operable against said yielding means to close said atmospheric communication.

8. In a fluid pressure brake apparatus, in combination, a brake pipe, means for supplying fluid under pressure to said brake pipe, brake controlling valve means operative upon a reduction in the pressure of fluid in said brake pipe to effect an application of the brakes and upon an increase in brake pipe pressure to effect the release of the brakes, automatically controlled means operative to vent fluid under pressure from said brake pipe, and an interlock valve device comprising valve means always subject to brake pipe pressure and responsive to the reduction in brake pipe pressure to move to a position for preventing restoration of brake pipe pressure, manually operable yielding means for effecting operation of said valve means out of said position to permit the release of the brakes, and means for indicating to the operator that said valve means has moved to said position.

9. In a fluid pressure brake for a railway vehicle, in combination, a brake pipe, a reduction of fluid pressure in which is adapted to effect an application of the brakes and an increase of fluid pressure in which is adapted to effect the release of the brakes, means controlled from the track for venting fluid under pressure from the brake pipe, valve means operative upon a predetermined reduction of brake pipe pressure to continue the venting of fluid under pressure from the brake pipe, means operated manually to effect the operation of said valve means to cut off said venting, and means for rendering the valve means ineffective to vent brake pipe fluid.

10. In a fluid pressure brake, in combination, a brake pipe, a brake valve device for controlling the supply of fluid under pressure to the brake pipe, brake controlling valve means operative upon a reduction in the pressure of fluid in said brake pipe to effect an application of the brakes and upon an increase in brake pipe pressure to effect the release of the brakes, means manually controlled independently of said brake valve device and operative upon a predetermined reduction in brake pipe pressure to establish communication from the brake pipe to atmosphere, until manipulated to close said communication for permitting the release of the brakes, and means conditioned by said brake valve device for rendering said manually controlled means ineffective to vent fluid under pressure from the brake pipe.

11. In a fluid pressure brake, the combination with a brake pipe, a reduction in pressure in which is adapted to effect an application of the brakes and an increase in pressure in which is adapted to effect the release of the brakes, of automatically controlled means operative from the track to vent fluid under pressure from said brake pipe, and a valve device responsive to a reduction in brake pipe pressure comprising a spring, a valve piston subject to the opposing pressures of said brake pipe and said spring for controlling communication from said brake pipe to the atmosphere, and manually controlled means adapted to effect the operation of said valve piston against the pressure of said spring to close said communication for permitting sufficient build up of brake pipe pressure to maintain said valve piston closed.

12. In a fluid pressure brake, the combination with a brake pipe, a reduction in pressure in which is adapted to effect an application of the brakes and an increase in pressure in which is adapted to effect the release of the brakes, of automatically controlled means operative to vent fluid under pressure from said brake pipe, and a valve device responsive to a reduction in brake pipe pressure comprising a casing having a passage communicating with the brake pipe, a spring, a valve piston subject to the opposing pressures of the brake pipe and said spring for controlling communication from said passage and consequently from the brake pipe to the atmosphere, and a normally open valve adapted to be manually operated to close said passage for permitting the pressure of fluid in said brake pipe to force said valve piston to its seat.

13. In a fluid pressure brake for a railway vehicle, in combination, a brake pipe, a brake valve device having a release position for supplying fluid under pressure to said brake pipe and a "handle off" position, brake controlling mechanism operative upon a reduction in the pressure of fluid in said brake pipe to effect an application of the brakes and upon an increase in brake pipe pressure to effect the release of the brakes, means controlled from the track and automatically operative to vent fluid under pressure from the brake pipe, valve means adapted to be set in a normal position to permit charging of the brake pipe with fluid under pressure by said brake valve device in the release position thereof and operative from said normal position upon a predetermined reduction in brake pipe pressure for preventing a subsequent restoration of brake pipe pressure until reset, means adapted to be manually operated for effecting the setting of said valve means, and means controlled by said brake valve device in the "handle off" position for rendering said valve means ineffective to prevent build up in brake pipe pressure.

14. In a fluid pressure brake for railway vehicles, the combination with a brake pipe, a reduction in pressure in which is adapted to effect an application of the brakes and an increase in pressure in which is adapted to effect the release of the brakes, and a brake valve device having release, lap, service and emergency positions, of automatic means controlled from the track for venting fluid under pressure from the brake pipe, valve means operative upon a predetermined reduction in brake pipe pressure for establishing communication from the brake pipe to the atmosphere, means manually operative to effect movement of said valve means to close said communication, and means controlled by said brake valve device and arranged to render said valve means ineffective in all positions of said brake valve device except release position.

15. In a fluid pressure brake, the combination with a brake pipe, a reduction in pressure in which is adapted to effect an application of the brakes and an increase in pressure in which is adapted to effect the release of the brakes, of automatically controlled means operative to vent fluid under pressure from said brake pipe, and a valve device responsive to a reduction in brake pipe pressure comprising a casing having a passage communicating with the brake pipe, a spring, a valve piston subject to the opposing pressures of the brake pipe and said spring for controlling communication from said passage and consequently from the brake pipe to the atmosphere, an auxiliary valve manually operable to a seated position to close said passage for permitting the pressure in said brake pipe to force said valve piston to its seat, and yielding means for biasing said auxiliary valve toward an unseated position.

CARLTON D. STEWART.
ELLIS E. HEWITT.